United States Patent Office 2,965,308
Patented Dec. 20, 1960

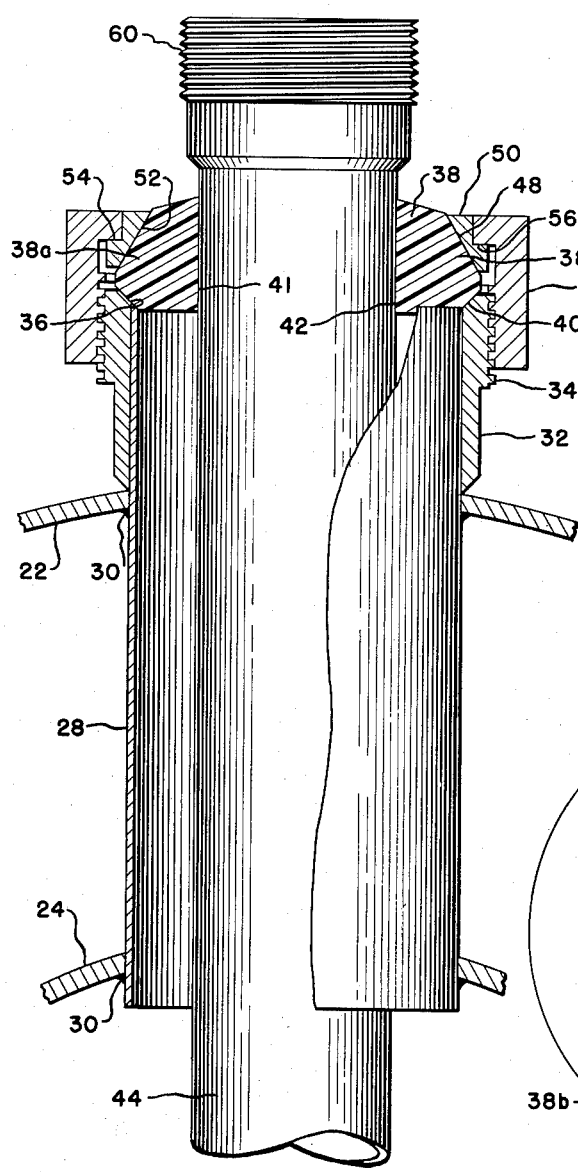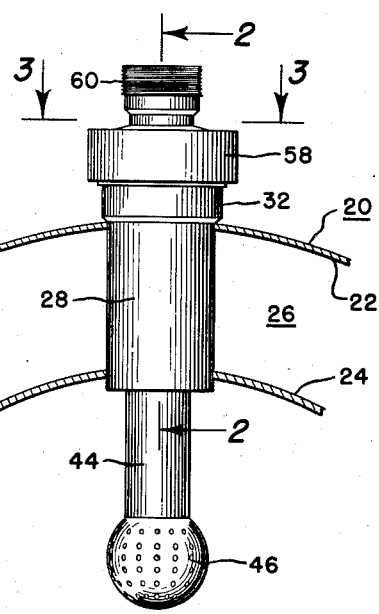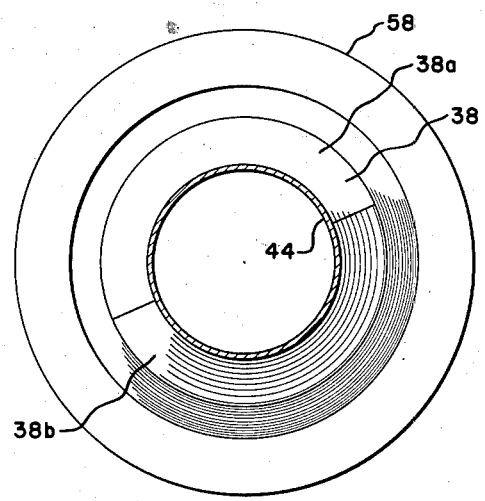

2,965,308

TANK ADAPTER KIT

Donald R. Holdren, West Liberty, Ohio, assignor to Holdren Brothers, Inc., West Liberty, Ohio, a corporation of Ohio Filed Feb. 17, 1958, Ser. No. 715,753

5 Claims. (Cl. 239—278)

The present invention relates to a connector or fitting for connecting a cylindrical element, such as a rod or pipe, to another object such as another pipe or tank.

The connector of the present invention includes a ferrule which is suitably connected to an object such as the end of a pipe. The ferrule is provided with a circular, tapered seat which faces inwardly. A circular packing, in the form of a resilient plastic, or resilient rubber or synthetic rubber, surrounds the rod or pipe and one side thereof is provided with a tapered seat which complements the tapered seat on the ferrules, and engages the ferrule seat. A similar seat is formed on the opposite side of the packing, and, like the first mentioned seat thereof, the seat on the opposite side is tapered outwardly but in the opposite direction from the first mentioned seat. This circular packing is formed in sections, i.e., it comprises at least two sectors. A pressure ring is provided, having a seat complementing the second mentioned seat of the packing ring. And means, such as a nut, is connected with the ferrule and clamps the pressure ring against the packing.

Further objects and advantages will be apparent from the following description, reference being had to the accompanying drawings wherein a preferred embodiment of the invention is illustrated.

In the drawings:

Fig. 1 is a fragmentary sectional view of an insulated tank, and including a pipe fitting to which another fitting, including a spray ball, is attached;

Figs. 2 and 3 are fragmentary sectional views taken on lines 2—2 and 3—3, respectively, of Fig. 1.

Referring more in detail to the drawings, a tank 20 is formed of concentric cylindrical elements 22 and 24, there being an air space 26 between the cylindrical elements. A spray ball, for cleaning purposes, is disposed with the tank 20 and is held in place by the fitting hereinafter described.

A fitting, in the form of a pipe or tube 28 extends downwardly from the top of tank 20 and through both cylindrical elements 22 and 24. This tube 28 is suitably sealed to elements 22 and 24 as by hard solder or by welding 30.

The upper end of tube 28, above the tank 20, carries a ferrule 32 which may be shrunken on the tube or secured thereto by soldering or welding. The upper, outer periphery of ferrule 32 is threaded as at 34. The tube 28 and ferrule 32 are circular in cross-section and the extreme outer or upper end thereof is tapered outwardly, upwardly to form a tapered sealing surface 36 facing radially inwardly.

A packing 38 engages the seat 36 of the ferrule 32. This packing is circular in radial cross-section and is provided, at the bottom or underside thereof with a sealing surface or seat 40 which is tapered outwardly, upwardly, and complements the sealing surface or seat 36 of ferrule 32 and extends to the periphery of the packing ring. This packing is formed of a material which has sufficient rigidity to grip and hold the spray ball assembly securely; has sufficient resiliency to form a liquid tight seal; has sufficient heat resisting characteristics to withstand the temperature of a cleaning solution at 150 degrees F. or more; it must be non-toxic, relatively non-absorbing, and have a smooth surface. Such material may be nylon or Teflon plastics, or synthetic rubber such as butyl synthetic Hycor or neoprene. It is formed of two sectors 38a and 38b, as is more clearly shown in Fig. 3. It is provided with a central opening forming semi-circular sealing surfaces 41 and 42 which tightly and sealingly embrace the tube 44 carrying the spray ball 46. Packing ring 38 is also provided with a tapered seat or surface 48 which extends to the periphery thereof. This taper is inwardly, upwardly.

A pressure ring 50, circular in radial cross-section, is provided with a tapered inner surface 52, tapering inwardly, upwardly and complementing taper 48 on the packing ring 38. Pressure ring 50 is formed of metal; it is provided with an upwardly facing, circularly shaped shoulder 54 which is adapted to be engaged by a downwardly facing shoulder 56 of a nut 58. Nut 58 is threaded onto the threads 34 of ferrule 32 and when tightened, it draws the pressure ring downwardly whereby surface 52 of said ring sealingly engages the surface 48 of the packing ring 38 and whereby seat 40 of packing ring 38 is sealed with nut 58 of the ferrule 32. Also, due to the tapers 48 and 52, the semi-circularly shaped sectors 38a and 38b are forced inwardly into seating relationship with the tube 44.

Thus it will be seen that by forming the packing ring from a plurality of sectors, a pipe, tube, or rod can be sealed in position although it has fittings such as spray ball 46 and coupling 60 thereon, of larger diameter than the tube or rod. The packing, being resilient, not only resiliently and sealingly engages the rod or pipe and the tapered sealing surface, but is not permanently deformed under sealing pressure and therefore can be reused time and again.

While the form of embodiment herein shown and described constitutes a preferred form, it is to be understood that other forms may be adopted falling within the scope of the claims that follow.

I claim:

1. A sanitary connector for removably securing a pipe and spray ball to a tank with said pipe extended through the wall of said tank and said spray ball disposed within said tank for washing the inner surface thereof, said connector comprising, in combination, a ferrule adapted to be connected to said tank, said ferrule having a tapered seat circular in cross-section and facing radially inwardly; a circularly shaped resilient plastic packing ring having a central opening and adapted to embrace the pipe, the periphery of said packing ring including a first tapered surface complementing said tapered seat and a second tapered surface; a pressure ring forming a second tapered seat complementing said second tapered surface; and means connected with the ferrule portion and bearing against said pressure ring for pressing the ring against the packing.

2. A connector as defined in claim 1 characterized in that the ferrule portion is externally threaded and said means comprises a nut threaded on the threads of the ferrule.

3. A sanitary connector for removably securing a pipe and spray ball to a tank with said pipe extended through the wall of said tank and said spray ball disposed within said tank for washing the inner surface thereof, said connector comprising, in combination, a tubular member for extension through said wall of said tank and including an open inner end for disposition adjacent the inner surface of said tank and an inner tube surface of greater diameter than said pipe to form a washable zone, between said inner tube surface and the confronting outer surface of said pipe, for receiving a spray of cleaning fluid from said spray ball, said tubular member including a ferrule portion; a circularly shaped resilient plastic packing ring having a central opening and adapted to embrace said pipe, said packing ring including a tapered peripheral surface and an end surface extending across the end of said washable zone between said confronting surfaces; a pressure ring including a packing engaging portion, certain of said portions being tapered and in engagement with said tapered peripheral surface of said packing ring; and means connected with said ferrule portion and bearing against said pressure ring for pressing said ring against said packing.

4. Sanitary apparatus for washing the inner surface of a dairy tank, or the like, said apparatus comprising, in combination, a mounting tube for extension through a wall of said tank in mounted relationship therewith; a cleansing fluid inlet conduit extended through said mounting tube the inner surface of said mounting tube being spaced from the outer surface of said conduit; a top end closure for said mounting tube, said end closure being in surrounding relationship with said conduit and forming a liquid-tight seal therewith, the bottom of said mounting tube being open whereby the inner surface of said tube and said end closure form a crevice-free washable zone and a spray head on the inner end of said conduit, said spray head including a plurality of orifices, certain of said orifices being arranged to release jets of cleansing fluid into said washable zone and certain other of said orifices being arranged to direct jets of cleansing fluid against the inner surfaces of said tank.

5. The cleansing apparatus defined in claim 4 wherein said top end closure includes a tapered peripheral surface and wherein a threaded annular member is carried by said mounting tube, said annular member being provided with an inwardly facing tapered surface for applying wedging action to said peripheral edge of said end closure.

References Cited in the file of this patent

UNITED STATES PATENTS

| | | |
|---|---|---|
| 993,660 | Driggs | May 30, 1911 |
| 1,182,737 | Bartz | May 9, 1916 |
| 1,404,780 | Mason | Jan. 31, 1922 |
| 1,809,407 | Fox | June 9, 1931 |
| 1,983,977 | Geiger | Dec. 11, 1934 |
| 2,735,700 | Bowan et al. | Feb. 21, 1956 |

FOREIGN PATENTS

| | | |
|---|---|---|
| 454,793 | Great Britain | Oct. 5, 1936 |
| 499,603 | Great Britain | Jan. 26, 1939 |